United States Patent
Choi et al.

(10) Patent No.: US 9,515,821 B2
(45) Date of Patent: Dec. 6, 2016

(54) APPARATUS AND METHOD FOR DATA ENCRYPTION

(71) Applicant: SAMSUNG SDS CO., LTD., Seoul (KR)

(72) Inventors: Kyu-Young Choi, Seoul (KR); Ji-Hoon Cho, Seoul (KR); Hyo-Jin Yoon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 14/576,727

(22) Filed: Dec. 19, 2014

(65) Prior Publication Data

US 2016/0080144 A1    Mar. 17, 2016

(30) Foreign Application Priority Data

Sep. 12, 2014   (KR) .................. 10-2014-0120842

(51) Int. Cl.
*H04L 9/00* (2006.01)
*H04L 9/08* (2006.01)
*H04L 9/06* (2006.01)

(52) U.S. Cl.
CPC ........... *H04L 9/0819* (2013.01); *H04L 9/0637* (2013.01); *H04L 9/0822* (2013.01); *H04L 9/0825* (2013.01); *H04L 2209/16* (2013.01); *H04L 2209/24* (2013.01)

(58) Field of Classification Search
CPC .. H04L 9/002; H04L 9/3066; H04L 2209/603; H04L 2209/16
See application file for complete search history.

(56) References Cited

U.S. PATENT DOCUMENTS

| 8,850,216 B1* | 9/2014 | Mikhailov | G06F 21/10 713/182 |
| 2006/0140401 A1* | 6/2006 | Johnson | G06F 21/14 380/44 |
| 2015/0270949 A1* | 9/2015 | Michiels | H04L 9/14 380/28 |

OTHER PUBLICATIONS

White Box Cryptography and an AES implmentation, Chow et al. 2002.*

* cited by examiner

*Primary Examiner* — Brandon Hoffman
*Assistant Examiner* — Helai Salehi
(74) *Attorney, Agent, or Firm* — Sughrue Mion, PLLC

(57) ABSTRACT

Provided is an apparatus for encrypting data including a key determiner configured to determine a cipher key for white-box cryptography (WBC)-based encryption and a symmetric key different from the cipher key and an encrypter configured to generate a ciphertext of the data using the WBC-based encryption and symmetric-key-based encryption with the symmetric key.

18 Claims, 13 Drawing Sheets

APPARATUS AND METHOD FOR DATA ENCRYPTION

CROSS-REFERENCE TO RELATED APPLICATION

This application claims priority to and the benefit of Korean Patent Application No. 10-2014-0120842, filed on Sep. 12, 2014, the disclosure of which is incorporated herein by reference in its entirety.

BACKGROUND

1. Field

Embodiments of the present disclosure relate to data encryption techniques, and more particularly, to technologies for enabling efficient data encryption while securing cryptographic security using white-box cryptography (WBC).

2. Discussion of Related Art

Various cryptographic techniques have been developed to transfer confidential data over a communication channel. In the related art, a number of cryptographic algorithms (for example, AES) assume that endpoints on a communication channel are reliable. That is, such an algorithm is intended to provide sufficient security while an attacker can access input/output of the cryptographic algorithm.

Typically, a cryptographic algorithm is implemented as software on a communication device such as a tablet or smartphone. However, software-based implementation of the cryptographic algorithm may be easily accessed by an attacker. An attacker may view binary values that are loaded in a memory on a communication device, change the values, and also control the implemented cryptographic algorithm in any desired way. As described above, when a key used for encryption/decryption is exposed to an attacker through the above memory attack, the attacker may easily decrypt even any cryptogram, and the cryptographic algorithm may be actually useless.

A white-box cryptography (WBC) technique may fundamentally solve the above problem, and its main concept is to make it difficult for an attacker to extract a cryptographic key although the cryptographic algorithm is exposed to an attacker. However, it is widely known that this technique takes more time (for example, several tens of times greater time) in encrypting data than an existing cryptographic technique. Thus, in the present, the WBC is used to encrypt data such as a short message (for example, a cipher key of 128 or 256 bits) and difficult to be used to encrypt a considerable amount of data. For example, many DRM solutions use an encryption/decryption algorithm (for example, a symmetric-key-based algorithm such as AES), irrespective of the WBC, in order to encrypt/decrypt data, and use the WBC only to safely manage a key for the encryption/decryption algorithm. However, despite such key management, there are still security vulnerabilities in that, while an encryption/decryption algorithm that is not implemented using the WBC is performed, a key for the algorithm may be exposed on a memory. Accordingly, a new approach that is robust against a memory attack and provides a quick encryption/decryption is required.

SUMMARY

The present disclosure is directed to a technique for performing encryption and decryption of data using a WBC-based encryption algorithm and a symmetric-key-based encryption algorithm.

According to an aspect of the present disclosure, there is provided an apparatus for encrypting data, the apparatus including: a key determiner configured to determine a cipher key for white-box cryptography (WBC)-based encryption and a symmetric key different from the cipher key; and an encrypter configured to generate a ciphertext of the data using the WBC-based encryption with the cipher key and symmetric-key-based encryption with the symmetric key.

This ciphertext may include a symmetric-key-based ciphertext and a WBC-based ciphertext to be decrypted for decrypting the symmetric-key-based ciphertext.

The encrypter may include: a WBC-based encrypter configured to apply the WBC-based encryption to a part of the data to generate the WBC-based ciphertext; and a symmetric-key-based encrypter configured to apply the symmetric-key-based encryption to another part of the data to generate the symmetric-key-based ciphertext.

The encrypter may further include an initializer configured to generate an initialization vector for encrypting the data, in which the WBC-based encrypter uses the initialization vector to apply the WBC-based encryption.

The encrypter may include: an initializer configured to generate an initialization vector for encrypting the data; a WBC-based encrypter configured to apply the WBC-based encryption to the initialization vector to generate the WBC-based ciphertext; and a symmetric-key-based encrypter configured to apply the symmetric-key-based encryption to the data to generate the symmetric-key-based ciphertext.

The initialization vector may include a counter value, and the symmetric-key-based encrypter may use the counter value to apply the symmetric-key-based encryption.

According to another aspect of the present disclosure, there is provided an apparatus for decrypting a ciphertext of data, the apparatus including: a WBC-based decrypter configured to apply WBC-based decryption that uses a cipher key to a part of the ciphertext to generate decrypted information; and a symmetric-key-based decrypter configured to decrypt another part of the ciphertext using symmetric-key based decryption in addition to a symmetric key different from the cipher key and the decrypted information.

The decrypted information may be a part of the data.

The decrypted information may be an initialization vector for encrypting the data.

According to still another aspect of the present disclosure, there is provided a method of encrypting data, the method including: determining a cipher key for white-box cryptography (WBC)-based encryption and a symmetric key different from the cipher key; and generating a ciphertext of the data using the WBC-based encryption with the cipher key and symmetric-key-based encryption with the symmetric key.

This ciphertext may include a symmetric-key-based ciphertext and a WBC-based ciphertext to be decrypted to decrypt the symmetric-key-based ciphertext.

The generating of the ciphertext may include applying the WBC-based encryption to a part of the data to generate the WBC-based ciphertext; and applying the symmetric-key-based encryption to another part of the data to generate the symmetric-key-based ciphertext.

The generating of the ciphertext may further include generating an initialization vector for encrypting the data, in which the generating of the WBC-based ciphertext includes using the initialization vector to apply the WBC-based encryption.

The generating of the ciphertext may include: generating an initialization vector for encrypting the data; applying the WBC-based encryption to the initialization vector to generate the WBC-based ciphertext; and applying the symmetric-key-based encryption to the data to generate the symmetric-key-based ciphertext.

The initialization vector may include a counter value, and the generating of the symmetric-key-based ciphertext may include using the counter value to apply the symmetric-key-based encryption.

According to yet another aspect of the present disclosure, there is provided a method of decrypting a ciphertext of data, the method including: applying WBC-based decryption that uses a cipher key to a part of the ciphertext to generate decrypted information; and decrypting another part of the ciphertext using symmetric-key-based decryption in addition to a symmetric key different from the cipher key and the decrypted information.

The decrypted information may be a part of the data.

The decrypted information may be an initialization vector for encrypting the data.

According to yet another aspect of the present disclosure, there is provided a computer program stored in a medium combined with hardware and configured to execute the method of encrypting data.

According to further another aspect of the present disclosure, there is provided a computer program stored in a medium combined with hardware and configured to execute the method of decrypting a ciphertext of data.

BRIEF DESCRIPTION OF THE DRAWINGS

The above and other objects, features, and advantages of the present disclosure will become more apparent to those of ordinary skill in the art by describing in detail example embodiments thereof with reference to the accompanying drawings, in which.

DETAILED DESCRIPTION OF EXAMPLE EMBODIMENTS

Hereinafter, embodiments of the present disclosure will be described in detail with reference to the accompanying drawings. The following detailed description will be provided for better understanding of a method, an apparatus, and/or a system that are disclosed in this specification. However, this is only example, and the present disclosure is not limited thereto.

In describing embodiments of the present disclosure, if a detailed description of known techniques associated with the present disclosure may unnecessarily obscure the gist of the present disclosure, it is determined that the detailed description thereof will be omitted. Also, the terms described below are defined with consideration of the functions in the present disclosure, and thus may vary depending on a user, intention of an operator, or custom. Accordingly, the definition would be made on the basis of the whole specification. The terminology used herein is for the purpose of only describing embodiments of the present disclosure, and should not be restrictive. The singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Figure 1:
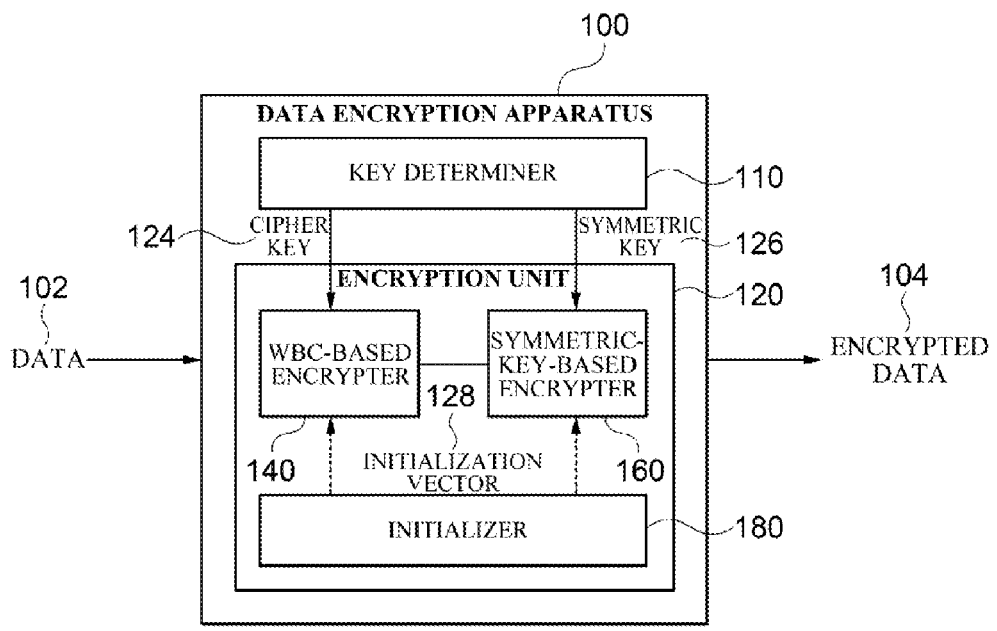
FIG. 1 is a view showing a data encryption apparatus according to an embodiment of the present disclosure.
Figure 2:
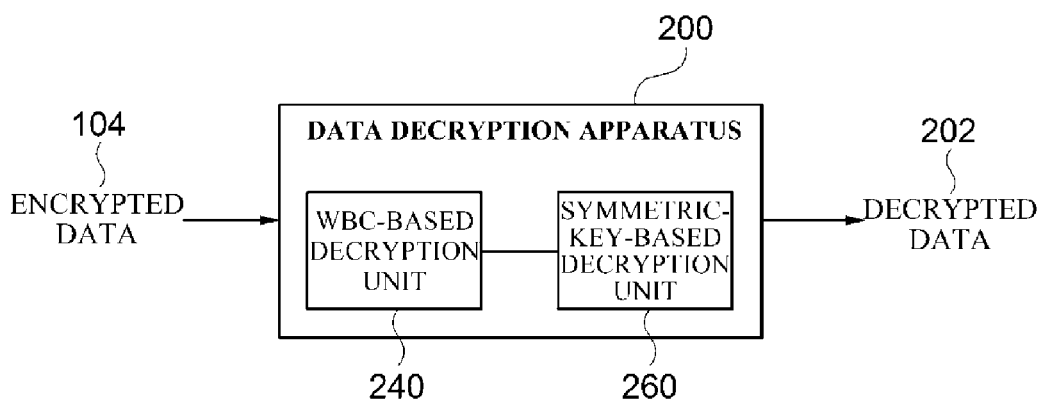
FIG. 2 is a view showing a data decryption apparatus according to an embodiment of the present disclosure.

FIG. 1 is a view showing a data encryption apparatus 100 according to an embodiment of the present disclosure, and FIG. 2 is a view showing a data decryption apparatus 200 according to an embodiment of the present disclosure. In some embodiments, the example data encryption apparatus 100 and the example data decryption apparatus 200 may be implemented or included respectively in separate computing devices. Each computing device may include a computer-readable storage medium such as at least one hardware processor and a memory accessible by the processor. The computer-readable storage medium may be disposed inside or outside the processor, and may be connected with the processor using well known means. A computer executable instruction may be stored in the computer-readable storing medium. The processor may execute an instruction stored in the computer-readable storage medium. When the instruction is executed by the processor, the instruction may allow the computing device to perform an operation according to an embodiment of the present disclosure.

The data encryption apparatus 100 is configured to receive data 102 (for example, a digitalized plaintext), encrypt the data 102, and generate encrypted data 104 (for example, a digitalized ciphertext). In particular, the data encryption apparatus 100 utilizes a WBC-based encryption algorithm to prevent a key for data encryption from being exposed by a memory attack and utilizes a symmetric-key-based encryption algorithm (for the sake of convenience, a term "symmetric-key-based" in the present specification is used in contrast with a "WBC-based" term and means that the WBC is not used with respect to the symmetric-key-based encryption/decryption) to efficiently perform the data encryption. In addition, in order to secure sufficient security, the data encryption apparatus 100 may set a cipher key for the WBC-based encryption algorithm and a symmetric key for the symmetric-key-based encryption algorithm to be different from each other.

For example, as shown in FIG. 1, the data encryption apparatus 100 may include a key determiner 110 and an encrypter 120. Each component of the data encryption apparatus 100 may be implemented as hardware of the computing apparatus (for example, a processor, a memory, an input/output interface, and the like).

The key determiner 110 may determine a cipher key 124 for the WBC-based encryption algorithm and a symmetric key 126 for the symmetric-key-based encryption algorithm. It is desirable that the cipher key 124 and the symmetric key 126 are different from each other.

The encrypter 120 may encrypt the data 102 using the WBC-based encryption algorithm having the cipher key 124 built therein (for example, by hard-coding and randomizing the cipher key 124 in a look-up table) and the symmetric-key-based encryption algorithm with the symmetric key 126. In other words, the encrypter 120 may generate the encrypted data 104 by applying the encryption algorithm that uses the cipher key 124 and the encryption algorithm that uses the symmetric key 126.

In some embodiments, as shown in FIG. 1, the encrypter 120 may include a WBC-based encrypter 140 and a symmetric-key-based encrypter 160. In order to encrypt the data 102, the WBC-based encrypter 140 and the symmetric-key-based encrypter 160 may generate at least one WBC-based ciphertext and at least one symmetric-key-based ciphertext, respectively. For example, the WBC-based encrypter 140 may generate the WBC-based ciphertext by applying the WBC-based encryption algorithm to predetermined information (for example, an initialization vector (IV) for encrypting the data 102 or a part of the data 102). The symmetric-key-encrypter 160 may generate the symmetric-key-based ciphertext by applying the symmetric-key-based encryption algorithm to another part of the data 102. Thus, the encrypted data 104 (that is, the ciphertext of the data 102) may include the generated WBC-based ciphertext and symmetric-key-based ciphertext.

According some embodiments, information (for example, the initialization vector for encrypting the data 102 or a part of the data 102) that is encrypted by the WBC-based encrypter 140 may be information that is to be used to decrypt the symmetric-key-based ciphertext. In other words, a block cipher operation mode for encrypting the data 102 may be defined such that decryption of the WBC-based ciphertext is necessary for decryption of the symmetric-key-based ciphertext. Accordingly, (even if the symmetric key 126 is exposed by a memory attack) a security leak may be prevented. In this operation mode, the encrypted data 104 may be decrypted by the data decryption apparatus 200 shown in FIG. 2. That is, the data decryption apparatus 200 is configured to decrypt the encrypted data 104 to generate decrypted data 202.

For example, as shown in FIG. 2, the data decryption apparatus 200 may include a WBC-based decrypter 240 and a symmetric-key-based decrypter 260. Each component of the data decryption apparatus 200 may be implemented as hardware of the computing apparatus (for example, a processor, a memory, an input/output interface, and the like). Specifically, the WBC-based decrypter 240 may apply a WBC-based decryption algorithm that uses the cipher key 124 to a part of the encrypted data 104 to generate decrypted information. For this, a certain initialization vector may be input to the WBC-based decryption algorithm. The symmetric-key-based decrypter 260 may decrypt another part of the encrypted data 104 using a symmetric-key-based decryption algorithm in addition to the decrypted information and the symmetric key 126. In some embodiments, depending on an encryption operation mode that is employed by the data encryption apparatus 100, the WBC-based decryption algorithm and the symmetric-key-based decryption algorithm of the data decryption apparatus 200 may be the same as the WBC-based encryption algorithm and the symmetric-key-based encryption algorithm of the data encryption apparatus 100.

Example operations of the data encryption apparatus 100 and the data decryption apparatus 200 will be described below in further detail.

Implementation in Which the WBC-Based Encryption Algorithm is Applied to a Part of the Data to be Encrypted In some embodiments, the encrypter 120 of the data encryption apparatus 100 may be configured to operate as follows.

First, the key determiner 110 may determine a key different form the cipher key 124 for the WBC-based encryption algorithm as the symmetric key 126 for the symmetric-key-based encryption algorithm.

The WBC-based encrypter 140 of the encrypter 120 may generate a WBC-based ciphertext by applying the WBC-based encryption algorithm that uses the cipher key 124 to a part of the data 102. The symmetric-key-based encrypter 160 of the encrypter 120 may generate a symmetric-key-based ciphertext by applying the symmetric-key-based encryption algorithm that uses the symmetric key 126 to another part of the data 102.

Furthermore, as shown in FIG. 2, the encrypter 120 may further include an initializer 180 that generates an initialization vector for encryption and decryption of the data 102. The initialization vector may be used to randomize encryption of the data 102 to generate a different ciphertext even when the same data is encrypted again. The WBC-based encrypter 140 may use the above initialization vector to apply the WBC-based encryption algorithm.

As described above, the operation mode for encrypting the data 102 may be defined such that decryption of the WBC-based ciphertext is necessary for decryption of the symmetric-key-based ciphertext. In this operation mode, if the WBC-based ciphertext is not decrypted, the symmetric-key-based decrypter 260 of the data decryption apparatus 200 may not decrypt the symmetric-key-based ciphertext.

Figure 3A:
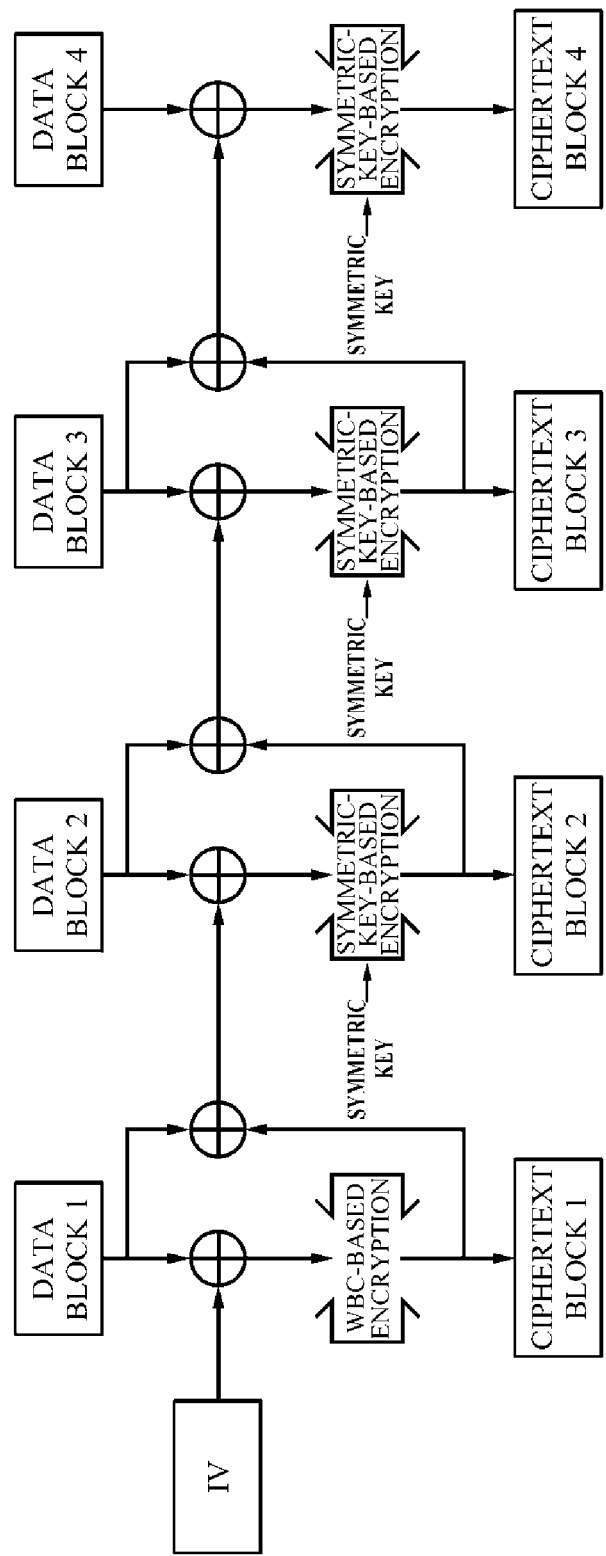
FIGS. 3A and 3B are views for describing a propagating cipher block chaining (PCBC) mode for a block cipher operation according to an embodiment of the present disclosure.

As an example, as shown in FIG. 3A, the encrypter 120 may perform an encryption operation in a propagating cipher block chaining (PCBC) mode. As seen in FIG. 3A, the WBC-based encrypter 140 performs an exclusive logical sum (XOR) operation between a first block of the data 102 and the initialization vector and then applies the WBC-based encryption algorithm to a result of the XOR operation to generate a first ciphertext block (that is, a WBC-based ciphertext). In order to generate blocks of a symmetric-key-based ciphertext, the symmetric-key-based encrypter 160 performs an XOR operation between each of the remaining blocks of the data 102 and its previous data block and ciphertext block to apply the symmetric-key-based encryption algorithm to a result of the XOR operation. If it is assumed that an index of the first data block is "1" and indexes of subsequent data blocks increase by 1, the encryption operation may be represented as the following equation.

$$C_1 = E^{WBC}(P_1 \text{XOR} IV)$$

$$C_i = E^{SYM}(P_i \text{XOR} P_{i-1} \text{XOR} C_{i-1}) (i \geq 2) \qquad \text{[Equation 1]}$$

where $C_i$ is an i-th ciphertext block, $P_i$ is an i-th data block, IV is an initialization vector, $E^{WBC}$ is a WBC-based encryption algorithm, $E^{SYM}$ is a symmetric-key-based encryption algorithm, and XOR is an XOR operation between blocks (for example, an XOR operation between bits when each block is a bit sequence).

Figure 3B:
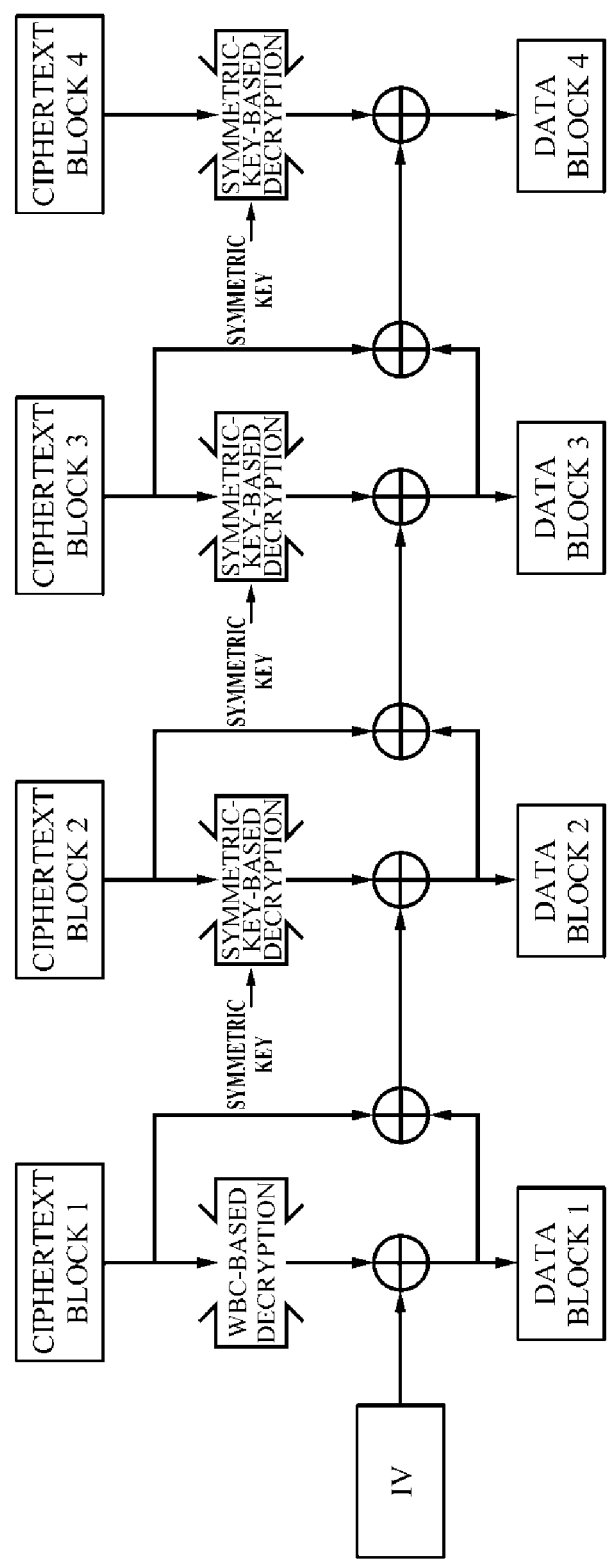

In this operation mode, as shown in FIG. 3B, the data decryption apparatus 200 may perform a decryption operation. As seen in FIG. 3B, the WBC-based decrypter 240 decrypts a first block (for example, a WBC-based ciphertext block) of the encrypted data 104 using the WBC-based decryption algorithm and then perform an XOR operation between the decrypted block and the initialization vector to acquire a first data block. In order to acquire the remaining data blocks, the symmetric-key-based decrypter 260 decrypts each of the remaining data blocks of the encrypted data 104 using the symmetric-key-based decryption algorithm and then performs an XOR operation between the decrypted block and its previous data block and ciphertext block. The decryption operation may be represented as the following equation.

$$P_1 D^{WBC}(C_1) \text{XOR} IV$$

$$P_i = D^{SYM}(C_i) \text{XOR} P_{i-1} \text{XOR} C_{i-1} (i \geq 2) \quad \text{[Equation 2]}$$

where $C_i$ is an i-th ciphertext block, $P_i$ is an i-th data block, IV is an initialization vector, $D^{WBC}$ is a WBC-based decryption algorithm, $D^{SYM}$ is a symmetric-key-based decryption algorithm, and XOR is an XOR operation between blocks (for example, an XOR operation between bits when each block is a bit sequence).

Figure 4A:
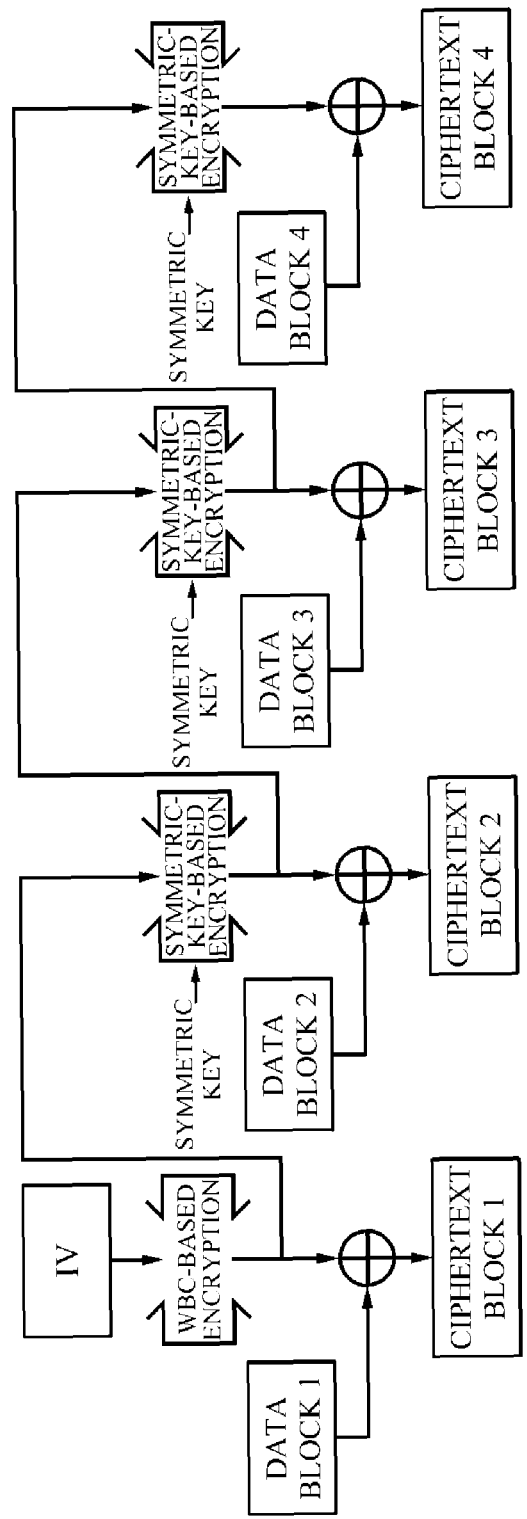
FIGS. 4A and 4B are views for describing an output feedback (OFB) mode for a block cipher operation according to an embodiment of the present disclosure.

As another example, as shown in FIG. 4A, the encrypter 120 may perform an encryption operation in an output feedback (OFB) mode. As seen in FIG. 4A, the WBC-based encrypter 140 encrypts an initialization vector using the WBC-based encryption algorithm to generate a first output block, and then performs an XOR operation between the output block and the first block of the data 102 to generate a first ciphertext block (that is, a WBC-based ciphertext). The symmetric-key-based encrypter 160 encrypts the remaining blocks of the data 102 to generate blocks of the symmetric-key-based ciphertext. Specifically, the symmetric-key-based encrypter 160 encrypts an (i−1)th output block using the symmetric-key-based encryption algorithm to generate an i-th output block and then performs an XOR operation between the i-th output block and the i-th block of the data 102 to generate an i-th ciphertext block. The encryption operation may be represented as the following equation.

$$O_1 = E^{WBC}(IV)$$

$$O_i = E^{SYM}(O_{i-1})(i \geq 2)$$

$$C_i = P_i \text{XOR} O_i (i \geq 1) \quad \text{[Equation 3]}$$

where $C_i$ is an i-th ciphertext block, $P_i$ is an i-th data block, $O_i$ is an i-th output block, IV is an initialization vector, $E^{WBC}$ is a WBC-based encryption algorithm, $E^{SYM}$ is a symmetric-key-based encryption algorithm, and XOR is an XOR operation between blocks (for example, an XOR operation between bits when each block is a bit sequence).

Figure 4B:
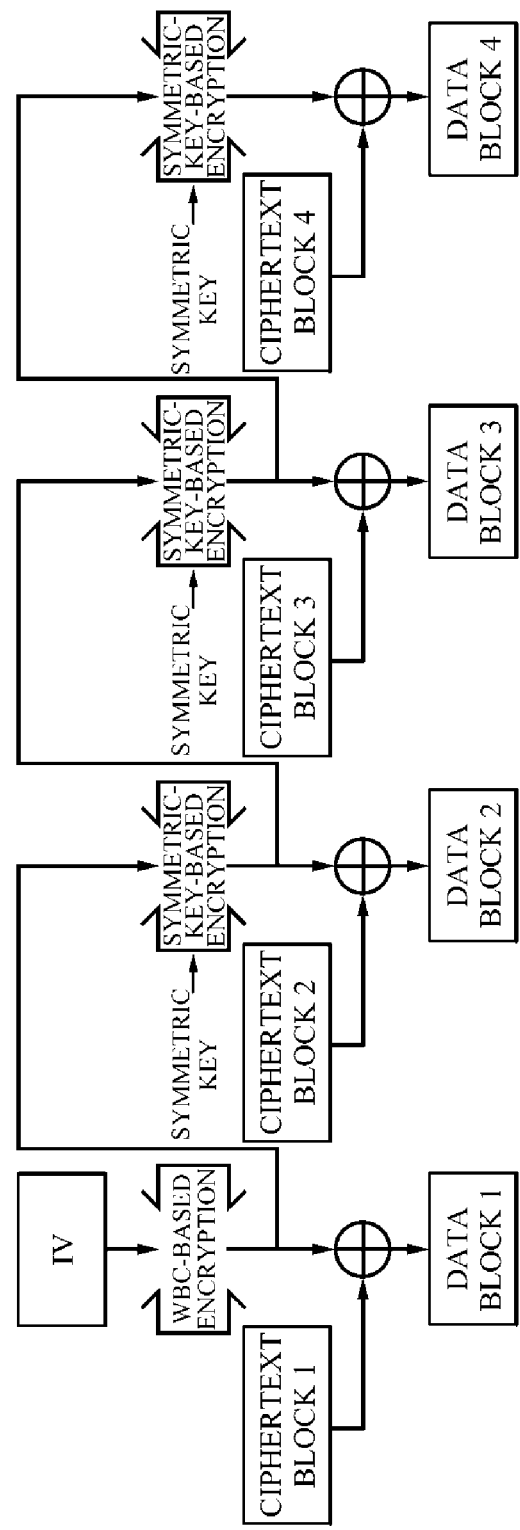

In this operation mode, as shown in FIG. 4B, the data decryption apparatus 200 may perform a decryption operation. Referring to FIG. 4B, in consideration of symmetry of the XOR operation, it can be seen that the decryption operation is performed the same as the above-described encryption operation (that is, the WBC-based decryption algorithm and symmetric-key-based decryption algorithm for the decryption operation are the same as the WBC-based encryption algorithm and symmetric-key-based encryption algorithm that are used for the encryption). The decryption operation may be represented as the following equation.

$$O_1 = E^{WBC}(IV)$$

$$O_i = E^{SYM}(O_{i-1})(i \geq 2)$$

$$P_i = C_i \text{XOR} O_i (i \geq 1) \quad \text{[Equation 4]}$$

where $C_i$ is an i-th ciphertext block, $P_i$ is an i-th data block, $O_i$ is an i-th output block, IV is an initialization vector, $E^{WBC}$ is a WBC-based encryption algorithm, $E^{SYM}$ is a symmetric-key-based encryption algorithm, and XOR is an XOR operation between blocks (for example, an XOR operation between bits when each block is a bit sequence).

Implementation in which the WBC-Based Encryption Algorithm is Applied to an Initialization Vector In some embodiments, the encrypter 120 of the data encryption apparatus 100 may be configured to operate as follows.

First, the key determiner 110 may determine a key different form the cipher key 124 for the WBC-based encryption algorithm as the symmetric key 126 for the symmetric-key-based encryption algorithm.

The initializer 180 of the encrypter 120 may generate an initialization vector for encrypting and decrypting the data 102. As described above, the initialization vector may be used to randomize encryption of the data 102 to generate a different ciphertext even when the same data is encrypted again.

Next, the WBC-based encrypter 140 of the encrypter 120 may generate a WBC-based ciphertext by applying the WBC-based encryption algorithm that uses the cipher key 124 to the above-described initialization vector. The symmetric-key-based encrypter 160 of the encrypter 120 may generate a symmetric-key-based ciphertext by applying the symmetric-key-based encryption algorithm that uses the symmetric key 126 to the data 102.

In the example implementation, the operation mode for encrypting the data 102 may be defined such that decryption of the WBC-based ciphertext is necessary for decryption of the symmetric-key-based ciphertext. As described above, in this operation mode, the WBC-based ciphertext may be necessarily decrypted in order for the symmetric-key-based decrypter 260 of the data decryption apparatus 200 to decrypt the symmetric-key-based ciphertext.

Figure 5A:
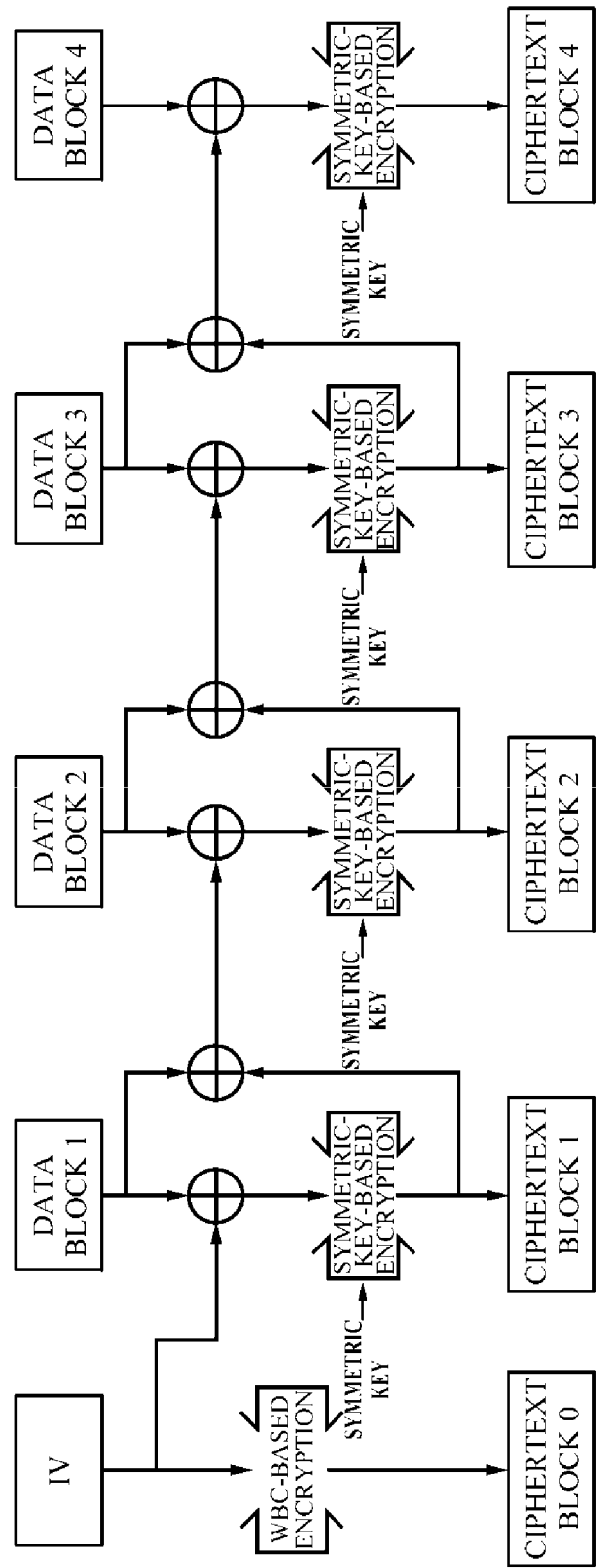
FIGS. 5A and 5B are views for describing a PCBC mode for a block cipher operation according to an embodiment of the present disclosure.

As an example, as shown in FIG. 5A, the encrypter 120 may perform an encryption operation in the PCBC mode. As seen in FIG. 5A, the WBC-based encrypter 140 encrypts the initialization vector using the WBC-based encryption algorithm to generate a WBC-based ciphertext block (for convenience, referred to as a "zeroth" ciphertext block). The symmetric-key-based encrypter 160 encrypts the blocks of the data 102 to generate blocks of the symmetric-key-based ciphertext. Specifically, the symmetric-key-based encrypter 160 performs an XOR operation between a first block of the data 102 and the initialization vector and then applies the WBC-based encryption algorithm to a result of the XOR operation to generate a first ciphertext block. Subsequently, the symmetric-key-based encrypter 160 performs an XOR operation between each of the remaining blocks of the data 102 and its previous data block and ciphertext block to apply the symmetric-key-based encryption algorithm to a result of the XOR operation. If it is assumed that an index of the first data block is "1" and each of indexes of subsequent data blocks increases by 1, the encryption operation may be represented as the following equation.

$$C_0 = E^{WBC}(IV)$$

$$C_1 = E^{SYM}(P_1 \text{XOR} IV)$$

$$C_i = E^{SYM}(P_i \text{XOR} P_{i-1} \text{XOR} C_{i-1})(i \geq 2) \quad \text{[Equation 5]}$$

where $C_i$ is an i-th ciphertext block, $P_i$ is an i-th data block, IV is an initialization vector, $E^{WBC}$ is a WBC-based encryption algorithm, $E^{SYM}$ is a symmetric-key-based encryption algorithm, and XOR is an XOR operation between blocks (for example, an XOR operation between bits when each block is a bit sequence).

Figure 5B:
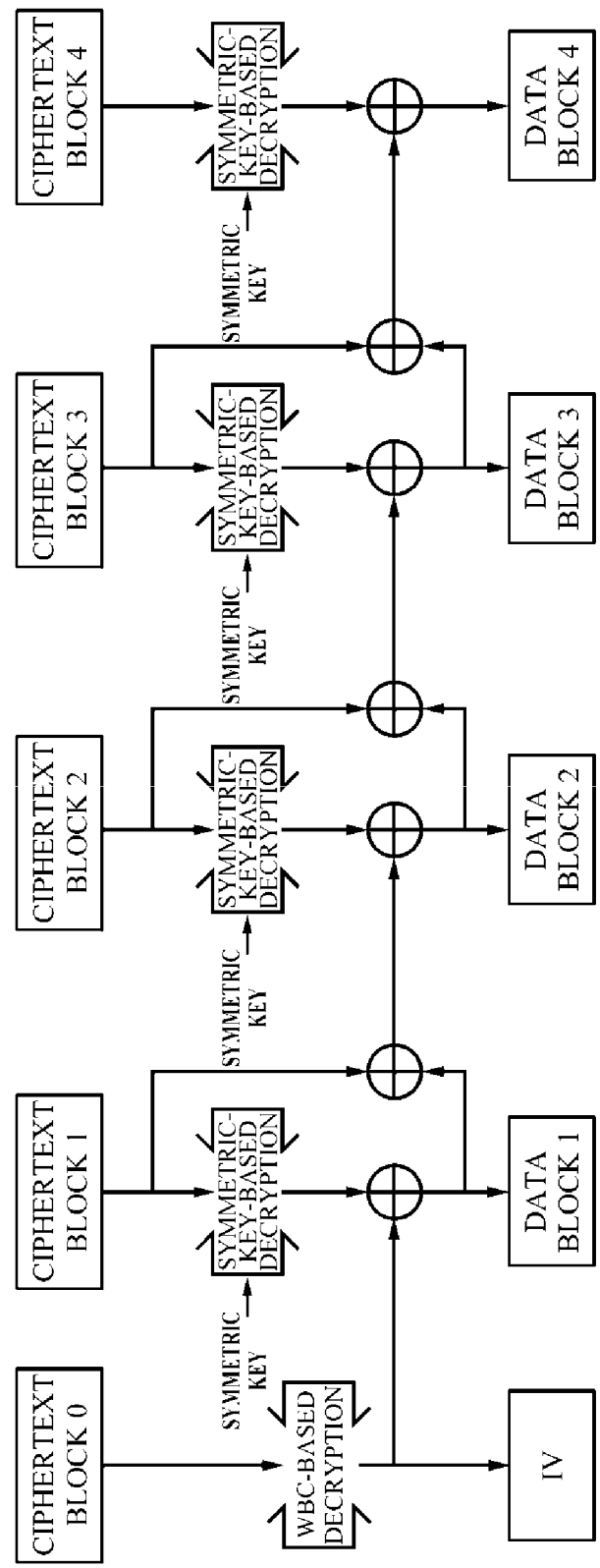

In this operation mode, as shown in FIG. 5B, the data decryption apparatus 200 may perform a decryption operation. As seen in FIG. 5B, the WBC-based decrypter 240 decrypts a "zeroth" block (that is, a WBC-based ciphertext block) of the encrypted data 104 using the WBC-based decryption algorithm to acquire the initialization vector. Furthermore, in order to acquire data blocks, the symmetric-key-based decrypter 260 decrypts a first block of the encrypted data 104 (that is, a ciphertext block immediately after the WBC-based ciphertext block) using the symmetric-key-based decryption algorithm and then performs an XOR operation between the decrypted first block and the initialization vector to acquire a first data block. Subsequently, the symmetric-key-based decrypter 260 decrypts each of the remaining data blocks of the encrypted data 104 using the symmetric-key-based decryption algorithm and then performs an XOR operation between the decrypted block and its previous data block and ciphertext block. The decryption operation may be represented as the following equation.

$$IV = D^{WBC}(C_0)$$

$$P_1 = D^{SYM}(C_1) \text{XOR} IV$$

$$P_i = D^{SYM}(C_i) \text{XOR} P_{i-1} \text{XOR} C_{i-1} (i \geq 2) \quad \text{[Equation 6]}$$

where $C_i$ is an i-th ciphertext block, $P_i$ is an i-th data block, IV is an initialization vector, $D^{WBC}$ is a WBC-based decryption algorithm, $D^{SYM}$ is a symmetric-key-based decryption algorithm, and XOR is an XOR operation between blocks (for example, an XOR operation between bits when each block is a bit sequence).

Figure 6A:
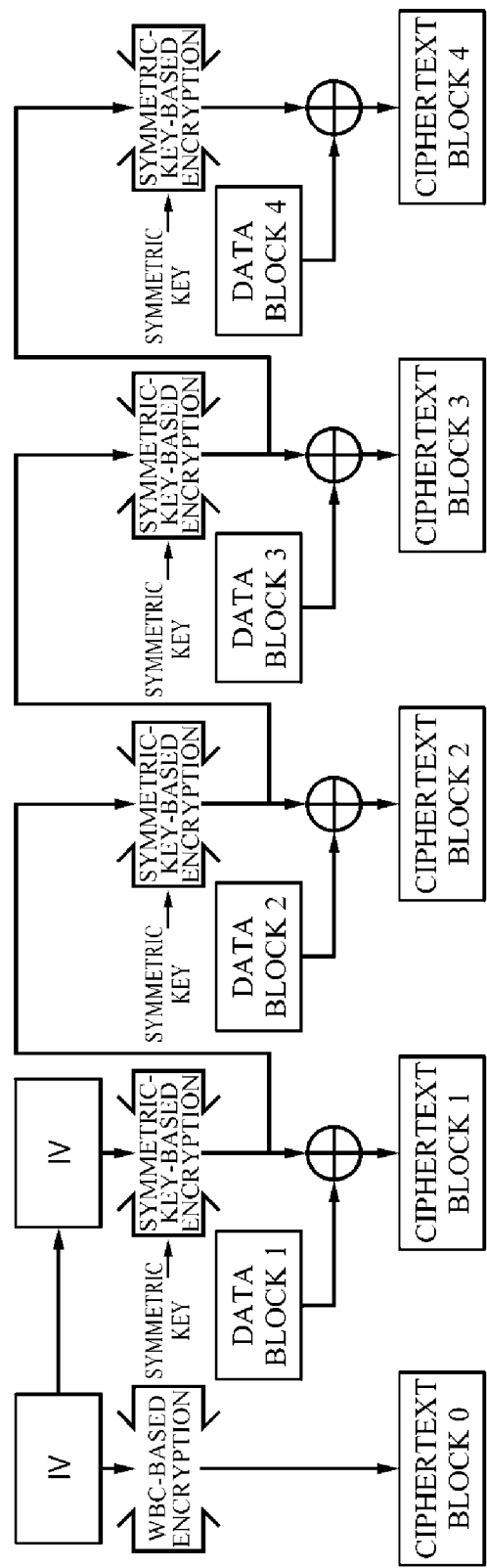
FIGS. 6A and 6B are views for describing an OFB mode for a block cipher operation according to an embodiment of the present disclosure.

As another example, as shown in FIG. 6A, the encrypter 120 may perform an encryption operation in the OFB mode. As seen in FIG. 6A, the WBC-based encrypter 140 encrypts the initialization vector using the WBC-based encryption algorithm to generate a WBC-based ciphertext block (for convenience, referred to as a "zeroth" ciphertext block). The symmetric-key-based encrypter 160 encrypts the blocks of the data 102 to generate blocks of the symmetric-key-based ciphertext. Specifically, the symmetric-key-based encrypter 160 encrypts the initialization vector using the symmetric-key-based encryption algorithm to generate a first output block and then performs an XOR operation between the first output block and the first block of the data 102 to generate a first ciphertext block. Subsequently, the symmetric-key-based encrypter 160 encrypts an (i−1)th output block using the symmetric-key-based encryption algorithm to generate an i-th output block and then performs an XOR operation between the i-th output block and the i-th block of the data 102 to generate an i-th ciphertext block. The encryption operation may be represented as the following equation.

$$C_0 = E^{WBC}(IV)$$

$$O_1 = E^{SYM}(IV)$$

$$O_i = E^{SYM}(O_{i-1})(i \geq 2)$$

$$C_i = \text{XOR} O_i (i \geq 1) \quad \text{[Equation 7]}$$

where $C_i$ is an i-th ciphertext block, $P_i$ is an i-th data block, $O_i$ is an i-th output block, IV is an initialization vector, $E^{WBC}$ is a WBC-based encryption algorithm, $E^{SYM}$ is a symmetric-key-based encryption algorithm, and XOR is an XOR operation between blocks (for example, an XOR operation between bits when each block is a bit sequence).

Figure 6B:
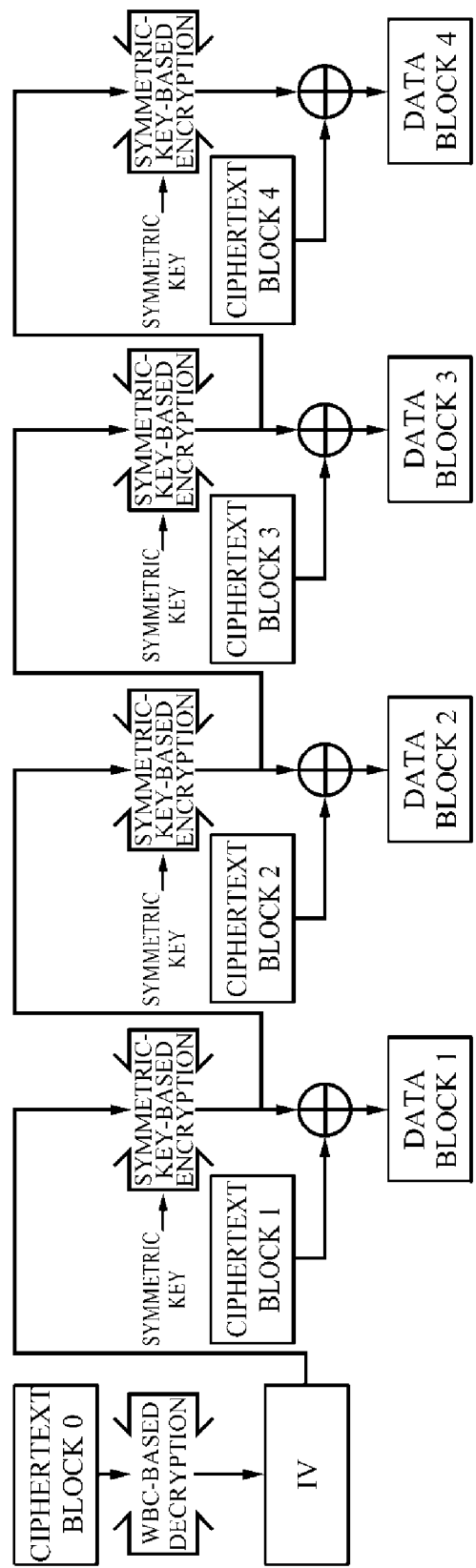

In this operation mode, as shown in FIG. 6B, the data decryption apparatus 200 may perform a decryption operation. Referring FIG. 6B, it can be seen that the decryption operation needs to acquire IV using the WBC-based decryption algorithm, but the other part (that is, the symmetric-key-based decryption algorithm for the decryption operation) may be performed the same as the above-described encryption operation. The decryption operation may be represented as the following equation.

$$IV = D^{WBC}(C_0)$$

$$O_1 E = E^{SYM}(IV)$$

$$O_i = E^{SYM}(O_{i-1})(i \geq 2)$$

$$P_i = C_i \text{XOR} O_i (i \geq 1) \quad \text{[Equation 8]}$$

where $C_i$ is an i-th ciphertext block, $P_i$ is an i-th data block, $O_i$ is an i-th output block, IV is an initialization vector, $D^{WBC}$ is a WBC-based decryption algorithm, $E^{SYM}$ is a symmetric-key-based encryption algorithm, and XOR is an XOR operation between blocks (for example, an XOR operation between bits when each block is a bit sequence).

Implementation in which Encryption is Applied in a Counter Mode

According to some embodiments, the initialization vector generated by the initializer 180 may include a counter value. The WBC-based encrypter 140 may use the above counter value to apply the WBC-based encryption algorithm.

Figure 7A:
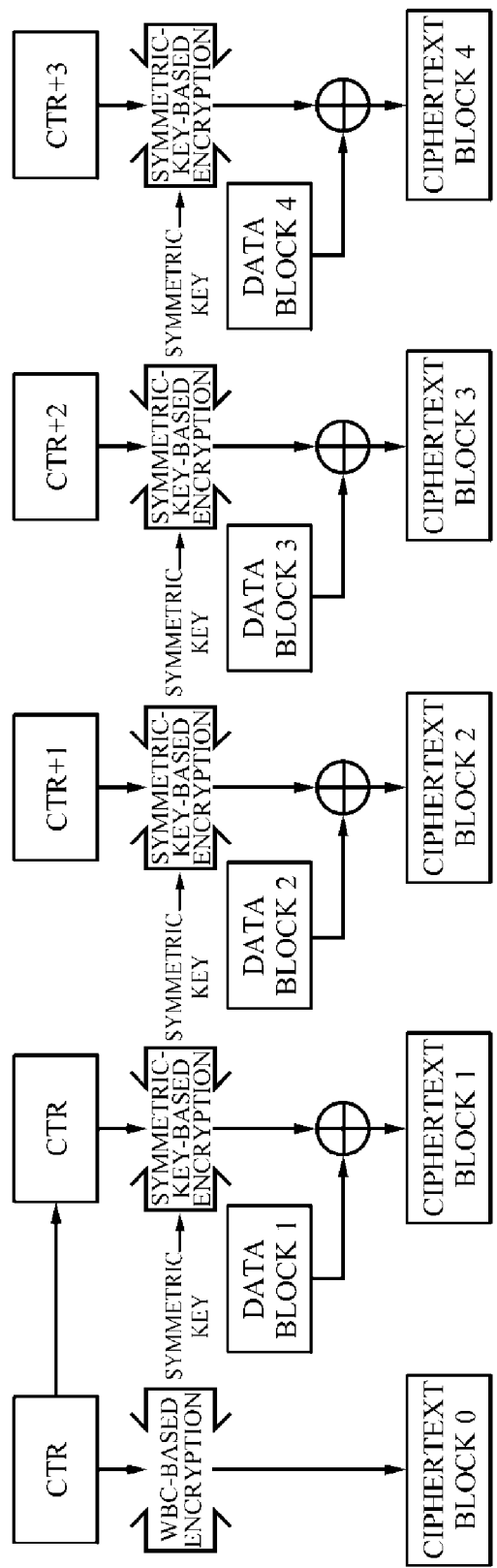
FIGS. 7A and 7B are views for describing a counter mode for a block cipher operation according to an embodiment of the present disclosure.

For example, as shown in FIG. 7A, the encrypter 120 may perform an encryption operation in the counter mode. For the encryption operation, the initializer 180 may generate counter values using a counter function that does not output the same value for a long time (for example, a function that outputs counter values increasing by 1 from an initial counter value). As seen in FIG. 7A, the WBC-based encrypter 140 encrypts an initial counter value (CTR) using the WBC-based encryption algorithm to generate a WBC-based ciphertext block (for convenience, referred to as a "zeroth" ciphertext block). The symmetric-key-based encrypter 160 encrypts the blocks of the data 102 to generate blocks of the symmetric-key-based ciphertext. Specifically, the symmetric-key-based encrypter 160 encrypts the initial counter value using the symmetric-key-based encryption algorithm and then performs an XOR operation between the encrypted initial counter value and the first block of the data 102 to generate a first ciphertext block. Likewise, the symmetric-key-based encrypter 160 encrypts an i-th counter value (for example, as shown in FIG. 7A, CTR+i−1) using the symmetric-key-based encryption algorithm and then performs an XOR operation between the encrypted i-th counter value and an i-th block of the data 102 to generate an i-th ciphertext block. Particularly, respective ciphertext blocks may be generated using a parallel processing method.

Figure 7B:
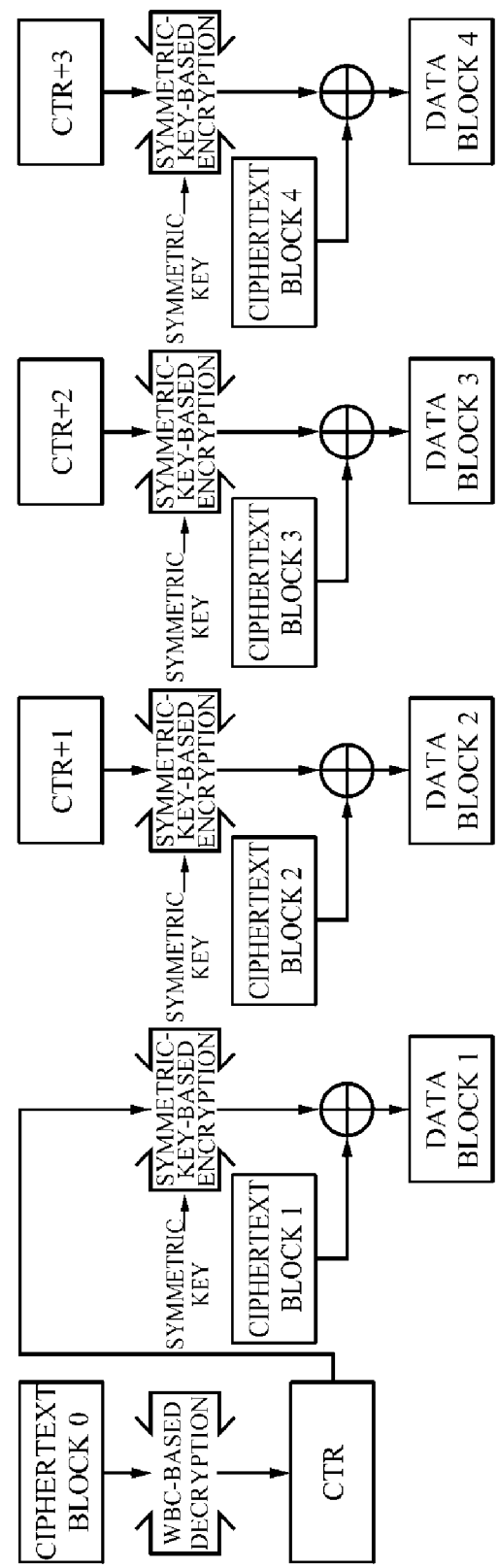

In this operation mode, as shown in FIG. 7B, the data decryption apparatus 200 may perform a decryption operation. Referring FIG. 7B, it can be seen that the decryption operation needs to acquire the initial counter value (CTR) using the WBC-based decryption algorithm, but the other part (that is, the symmetric-key-based decryption algorithm for the decryption operation) may be performed the same as the above-described encryption operation.

Figure 8:
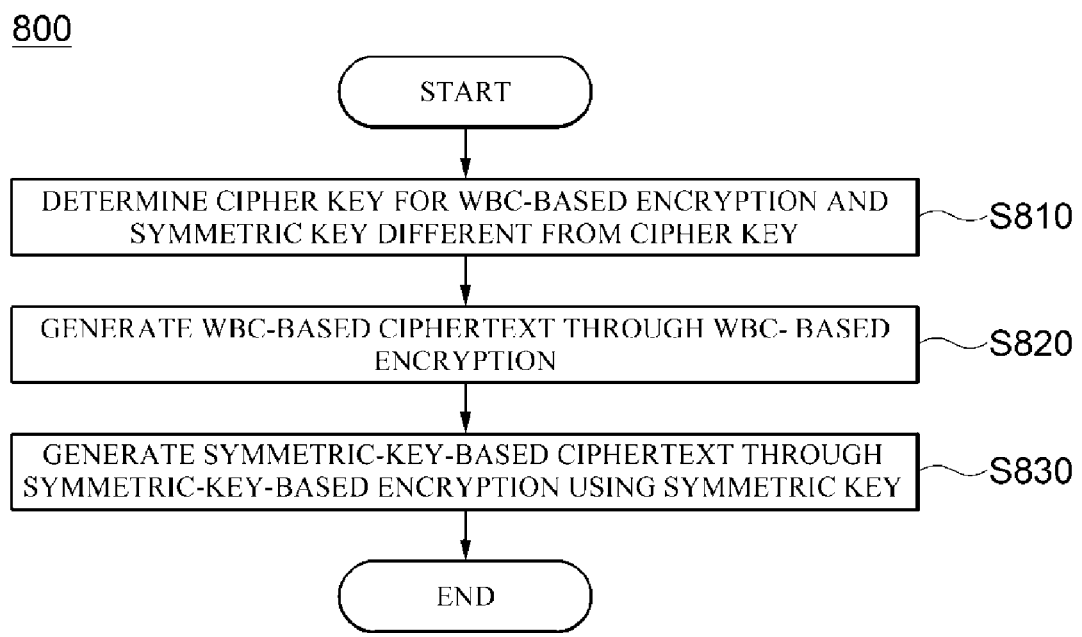
FIG. 8 is a flowchart showing a process for encrypting data according to an embodiment of the present disclosure.

FIG. 8 is a flowchart showing a process for encrypting data according to an embodiment of the present disclosure. For example, operations included in an example data encryption process 800 of FIG. 8 may be performed by the data encryption apparatus 100.

To encrypt data, the process 800 involves generating a ciphertext of the data through WBC-based encryption and symmetric-key-based encryption with a symmetric key. This ciphertext may include a symmetric-key-based ciphertext and a WBC-based ciphertext to be decrypted to decrypt the symmetric-key-based ciphertext. For this, the process 800 starts and then proceeds to operation S810.

In operation S810, a cipher key for the WBC-based encryption and a symmetric key that is different from the cipher key are determined.

In operation S820, a WBC-based ciphertext is generated through the WBC-based encryption. In some embodiments, the WBC-based encryption may be applied to a part of data to be encrypted. An initial vector for randomizing encryption of the data is generated and then used to apply the WBC-based encryption. In some embodiments, the WBC-based encryption may be applied to the initialization vector instead of a part of data.

In operation S830, a symmetric-key-based ciphertext is generated through the symmetric-key-based encryption that uses the symmetric key. When the WBC-based encryption is applied to a part of data, the symmetric-key-based encryption may be applied to the remaining part of the data. When the WBC-based encryption is applied to the initialization vector, the symmetric-key-based encryption may be applied to the data. If necessary, the initialization vector (for example, an initialization vector including a nonce and a counter value) may be used to apply the symmetric-key-based encryption.

Figure 9:
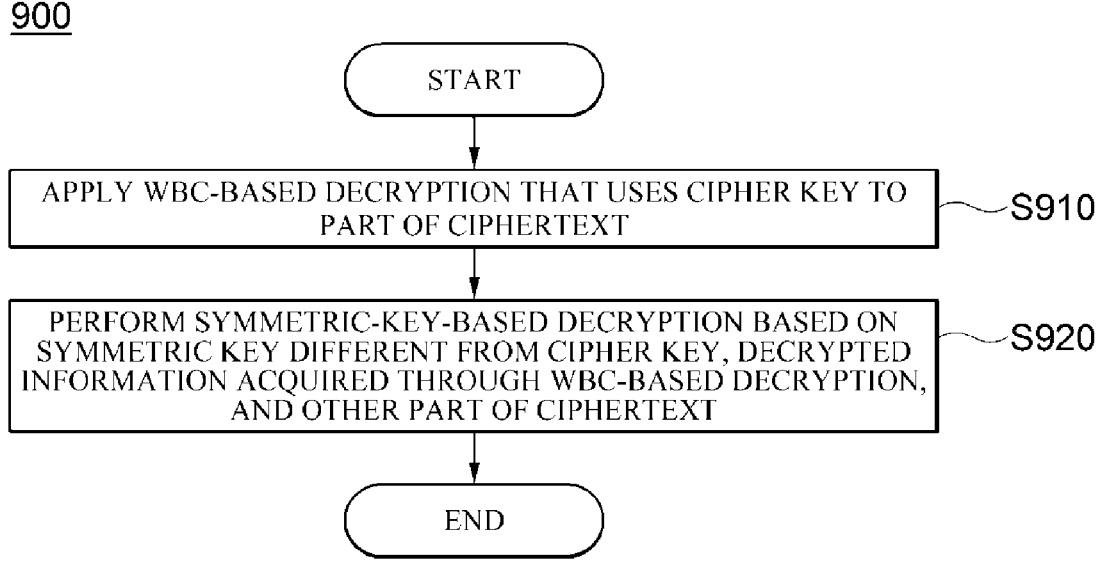
FIG. 9 is a flowchart showing a process for decrypting data according to an embodiment of the present disclosure.

FIG. 9 is a flowchart showing a process for decrypting a ciphertext of data according to an embodiment of the present disclosure. For example, operations included in an example data decryption process 900 of FIG. 9 may be performed by the data decryption apparatus 200.

The process 900 starts and then proceeds to operation S910. In operation S910, WBC-based decryption using a cipher key is applied to a part of a ciphertext of data. In operation S920, a symmetric-key-based decryption is performed based on a symmetric key different from the cipher key, decrypted information that is acquired through the decryption, and another part of the ciphertext. The decrypted information may be an initialization vector used to randomize encryption of data or a part of the data.

A data encryption technique according to some embodiments enables encryption and decryption to be efficient and safe from a memory attack of an attacker.

A data encryption technique according to some embodiments uses the WBC-based encryption algorithm and thus does not require key management.

A variety of WBC-based encryption algorithms may be applied to a data encryption technique according to some embodiments.

Embodiments of the present disclosure may include a computer-readable storage medium including a program for performing methods described in this specification on a computer. The computer-readable storage medium may include a program instruction, a local data file, a local data structure, or a combination thereof. The computer-readable storage medium may be designed and configured only for the present disclosure. Examples of the computer-readable storage medium include a magnetic medium, such as a hard disk, a floppy disk, and a magnetic tape, an optical recording medium, such as a CD-ROM, a DVD, etc., a magneto-optical medium such as a floptical disk, and a hardware device specially configured to store and perform a program instruction, such as a ROM, a RAM, a flash memory, etc. Examples of the program instruction include a high-level language code executable by a computer with an interpreter, in addition to a machine language code made by a compiler.

Although example embodiments of the disclosure has been described in detail, it will be understood by those skilled in the art that various changes may be made without departing from the spirit or scope of the disclosure. Thus, the scope of the present disclosure is to be determined by the following claims and their equivalents, and shall not be restricted or limited by the foregoing detailed description.

What is claimed is:

1. An apparatus, intended for use in encrypting data, comprising:
a key determiner configured to determine a cipher key, for white-box cryptography (WBC)-based encryption, and a symmetric key different from the cipher key;
an encrypter configured to generate a ciphertext of the data by applying the WBC-based encryption with the cipher key to a part of the data and by applying symmetric-key-based encryption with the symmetric key to another part, to which the WBC-based encryption is not applied, of the data, wherein the encrypter is further configured to generate the ciphertext so as to include:
a symmetric-key-based ciphertext; and a WBC-based ciphertext adapted for use in decrypting the symmetric-key-based ciphertext; and
one or more hardware processors implementing the key determiner and the encrypter.

2. The apparatus of claim 1, wherein the encrypter comprises:
a WBC-based encrypter configured to apply the WBC-based encryption to a first part of the data to generate the WBC-based ciphertext; and
a symmetric-key-based encrypter configured to apply the symmetric-key-based encryption to a second part of the data different from the first part of the data to generate the symmetric-key-based ciphertext.

3. The apparatus of claim 1, wherein the encrypter comprises: an initializer configured to generate an initialization vector;
a WBC-based encrypter configured to apply the WBC-based encryption to the initialization vector to generate the WBC-based ciphertext; and
a symmetric-key-based encrypter configured to apply the symmetric-key-based encryption to the data to generate the symmetric-key-based ciphertext.

4. The apparatus of claim 2, wherein:
the encrypter further comprises an initializer configured to generate an initialization vector; and
the WBC-based encrypter uses the initialization vector to apply the WBC-based encryption.

5. The apparatus of claim 3, wherein: the initialization vector includes a counter value; and
the symmetric-key-based encrypter is further configured to use the counter value to apply the symmetric-key-based encryption.

6. An apparatus, intended for use in decrypting a ciphertext of data, comprising:
a white-box cryptography (WBC)-based decrypter configured to apply WBC-based decryption, using a cipher key, only to a first part of the ciphertext, to generate decrypted information; and
a symmetric-key-based decrypter configured to decrypt a second part, to which WBC-based encryption has not been applied, of the ciphertext by applying symmetric-key-based decryption, using a symmetric key and the decrypted information; and one or more hardware processors implementing the WBC-based decrypter and the symmetric-key-based decrypter;
wherein the symmetric key is different from the cipher key.

7. The apparatus of claim 6, wherein the decrypted information is a part of the data.

8. The apparatus of claim 6, wherein the decrypted information is an initialization vector for encrypting the data.

9. A method, of encrypting data, comprising: determining a cipher key for white-box cryptography (WBC)-based encryption;
determining a symmetric key different from the cipher key;
generating a ciphertext of the data by applying the WBC-based encryption with the cipher key to a part of the data and by applying symmetric-key-based encryption with the symmetric key to another part, to which the WBC-based encryption is not applied, of the data, wherein the generating of the ciphertext is performed so as to include:
a symmetric-key-based ciphertext; and a WBC-based ciphertext adapted for use in decrypting the symmetric-key-based ciphertext, and
wherein the generating of the ciphertext is implemented by one or more hardware processors.

10. The method of claim 9, wherein the generating of the ciphertext further comprises:
applying the WBC-based encryption to a first part of the data to generate the WBC-based ciphertext; and
applying the symmetric-key-based encryption to a second part of the data different from the first part of the data to generate the symmetric-key-based ciphertext.

11. The method of claim 9, wherein the generating of the ciphertext comprises:
generating an initialization vector;
applying the WBC-based encryption to the initialization vector to generate the WBC-based ciphertext; and
applying the symmetric-key-based encryption to the data to generate the symmetric-key-based ciphertext.

12. The method of claim 10, wherein the generating of the ciphertext further comprises generating an initialization vector for encrypting the data, wherein the generating of the WBC-based ciphertext comprises using the initialization vector to apply the WBC-based encryption.

13. The method of claim 11, wherein:
the generating of the initialization vector is performed so that the initialization vector includes a counter value; and
the generating of the symmetric-key-based ciphertext comprises using the counter value to apply the symmetric-key-based encryption.

14. A method, of decrypting a ciphertext of data, comprising:
applying white-box cryptography (WBC)-based decryption, using a cipher key, only to a first part of the ciphertext, to generate decrypted information; and
decrypting a second part, to which WBC-based encryption has not been applied, of the ciphertext by applying symmetric-key-based decryption, using a symmetric key and the decrypted information;
wherein:
the symmetric key is different from the cipher key; and
the applying of the WBC-based decryption and the applying of the symmetric-key-based decryption are implemented by one or more hardware processors.

15. The method of claim 14, wherein the decrypted information is a part of the data.

16. The method of claim 14, wherein the decrypted information is an initialization vector for encrypting the data.

17. A computer program product comprising a non-transitory computer readable medium storing instructions configured to enable a hardware processor to implement operations including:
determining a cipher key for white-box cryptography (WBC)-based encryption;
determining a symmetric key different from the cipher key; and
generating a ciphertext of the data by applying the WBC-based encryption with the cipher key to a part of the data and by applying symmetric-key-based encryption with the symmetric key to another part, to which the WBC-based encryption is not applied, of the data, wherein the generating of the ciphertext is performed so as to include:
a symmetric-key-based ciphertext; and a WBC-based ciphertext adapted for use in decrypting the symmetric-key-based ciphertext.

18. A computer program product comprising a non-transitory computer readable storing instructions configured to enable a hardware processor to implement operations including:
applying white-box cryptography (WBC)-based decryption, using a cipher key, only to a first part of the ciphertext, to generate decrypted information; and
decrypting a second part, to which WBC-based encryption has not been applied, of the ciphertext by applying symmetric-key-based decryption, using a symmetric key and the decrypted information;
wherein the symmetric key is different from the cipher key.

* * * * *